United States Patent [19]

Sandoval

[11] Patent Number: 5,532,877
[45] Date of Patent: Jul. 2, 1996

[54] INFINITE KALEIDOSCOPES

[76] Inventor: Juan Sandoval, Suchil 137, Mexico City 04380, Mexico

[21] Appl. No.: 331,105

[22] Filed: Oct. 28, 1994

[51] Int. Cl.[6] .................................................. G02B 27/08
[52] U.S. Cl. ................................................................ 359/616
[58] Field of Search ..................................... 359/616, 617

[56] References Cited

U.S. PATENT DOCUMENTS 1,010,808  12/1911  Scheufler.
3,603,663  9/1971  Lewis.
3,661,439  5/1972  Burnside et al..
4,050,790  9/1977  Jorwa.
4,815,801  3/1989  Anderson.

Primary Examiner—Michael L. Gellner
Assistant Examiner—D. P. Malley
Attorney, Agent, or Firm—Jacobson, Price, Holman & Stern

[57] ABSTRACT

A pocket infinite kaleidoscope has two opposed cylindrical cases each one with an internal mirror. Multiple circular colored flexible intertwined springs are adhered to the respective mirrors and a peephole is formed through one of the mirrors. The kaleidoscope is handled by an observer by displacing the cases by stretching the springs and looking through the peephole to create an amusing virtual image.

12 Claims, 6 Drawing Sheets

INFINITE KALEIDOSCOPES

BACKGROUND OF THE INVENTION

The original kaleidoscope design is attributed to Sir David Brewster in 1815. It consisted of two mirrors placed in a V shape arrangement.

U.S. Pat. No. 1,010,808 of December 1911 to Scheufler; U.S. Pat. No. 3,603,663 of Sep. 7, 1971 to Peter Lewis; U.S. Pat. No. 3,661,439 of May 9, 1972 to John L. Burnside and U.S. Pat. No. 4,815,801 of Mar. 28, 1989 to Kenneth J. Anderson, all cover two mirror kaleidoscopes placed in a V shaped arrangement.

A kaleidoscope according to the present invention has two mirrors but the mirrors are not in a V shaped arrangement.

Opposed mirrors are known, for example, in barber shops and in vanity mirrors. The images produced by this arrangement are parallel reflections to infinity but, since the observer is located between the opposed mirrors, the first reflection obstructs the perspective to infinity.

U.S. Pat. No. 4,050,790 of Sep. 27, 1977, to Mildred M. Jorwa, discloses angularly movable mirrors, able to be placed in an opposite arrangement. It is designed to reflect the observer and the infinite perspective is not visible. This invention suppresses the image of the observer.

SUMMARY OF THE INVENTION

According to the invention, there is provided a kaleidoscope formed by two opposed inside reflecting mirrors. One of the mirrors has at least one peephole within the area of the mirror, or two peepholes for binocular sight. The mirrors can be of any shape or size. The size of the peepholes are preferably the size of the human pupil.

DESCRIPTION OF THE PREFERRED EMBODIMENT

Figure 1:
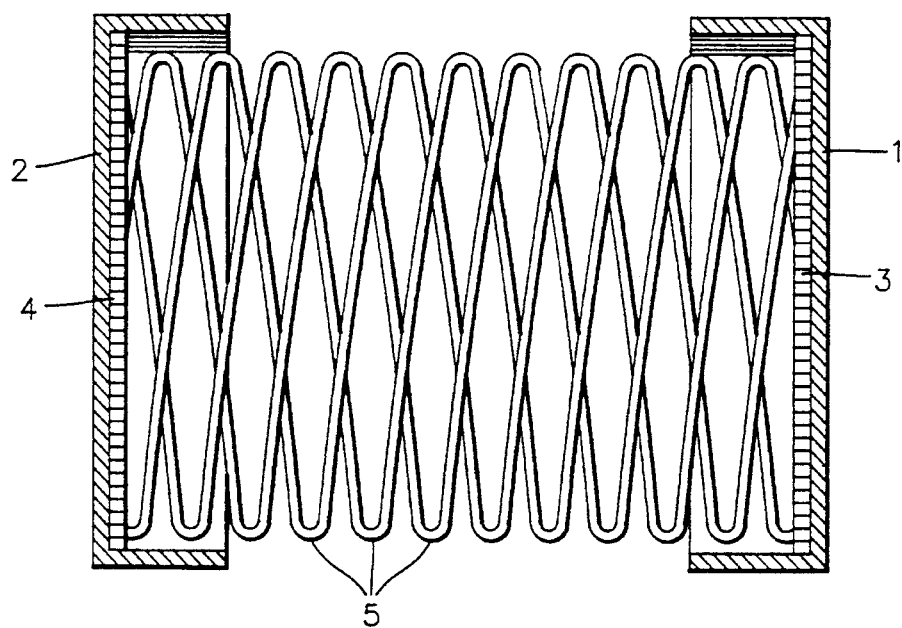
FIG. 1 is a sectional side elevational view of a kaleidoscope according to the invention.

As shown in FIG. 1, the novel infinite kaleidoscope of the invention comprises a housing preferably in the form of two cylindrical transparent plastic cases 1 and 2, with two circular mirrors 3 and 4, adhered to the bottom of said cases 1 and 2. Multiple helical colored flexible intertwined springs 5 of circular cross section, are adhered to the insides of cases 1 and 2 and mirrors 3 and 4 at the respective opposite ends of the springs. Thus the cases can be closed together by compressing the springs or opened out by expanding the springs.

Figure 2:
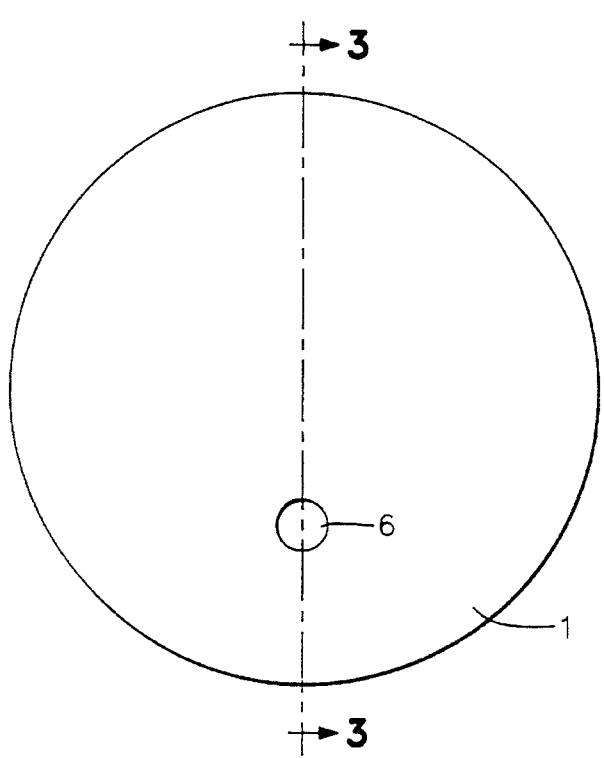
FIG. 2, is a front view of the kaleidoscope.

FIG. 2 shows a front housing case 1 with a peephole 6 in the case and its associated mirror.

Figure 3:
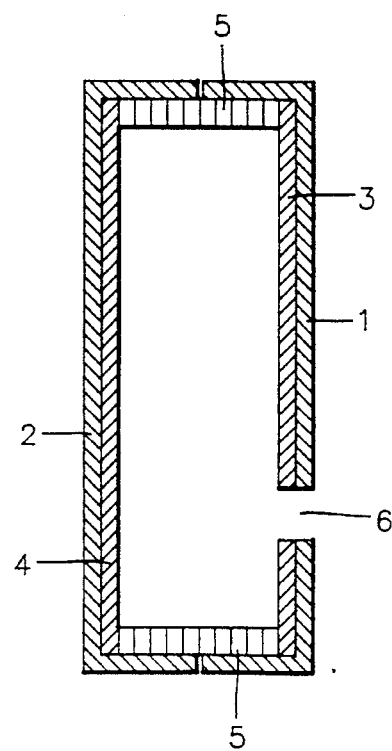
FIG. 3, is a cross sectional view, taken along a line A–A' in FIG. 2 with the kaleidoscope closed.
Figure 4:
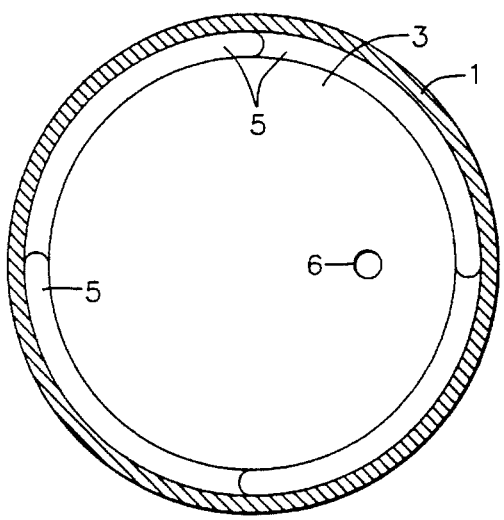
FIG. 4, is a cross sectional view taken along line B–B' in FIG. 3 with circular springs.

FIG. 3, shows the front case 1 joined to the rear case 2 with inside mirrors 3 and 4. Peephole 6 goes through front case 1 and mirror 3. The intertwined multiple springs 5, are contracted, adhered by their ends to said cases 1–2.

Figure 20:
FIG. 20, is a perspective view showing how the infinite kaleidoscope of the invention is used.

FIG. 20 shows how an observer would handle the novel kaleidoscope moving the cases toward and away from each other and/or relatively twisting or tilting the cases.

Figure 21:
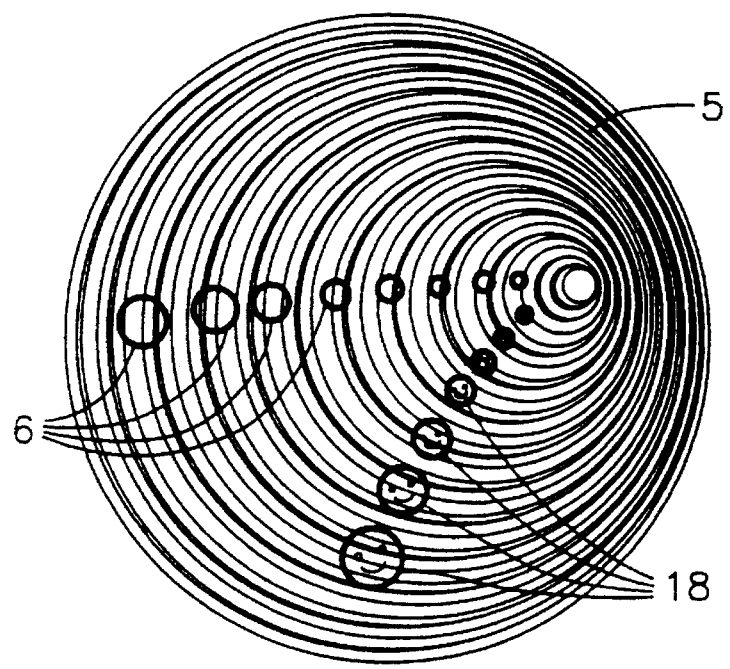
FIG. 21, is a perspective view of a disaligned image with a circular face sticker in a kaleidoscope with circular springs.

FIG. 21 shows a multiple reflection image of peephole 6, springs 5 and a sticker 18 adhered to one of the mirrors.

The mirrors 3 and 4 may have independent back and forward movement, and they can be tilted until a perfect alignment in parallel is achieved.

Any objects of adequate size placed between the mirrors 3 and 4 are multiply reflected to create a virtual image floating in space to a vanishing point to infinity. When an image is adhered to one of the mirrors, it is reflected creating an alternate image every two reflections. If the object is separated from the mirrors, it will be reflected in front and rear images to infinity. In order to look at this image, the peephole 6 is provided through one of the mirrors. This peephole 6, with the eye of the observer, will always be reflected as described before.

It is a feature of this invention to provide a kaleidoscope small enough to be hand held. The housing is formed by the two transparent cylindrical cases 1 and 2, that can be made out of clear plastic. The circular mirrors 3 and 4, with a diameter that fit up inside of the cases are adhered to the bottom side of each case with the reflecting surfaces to the outside.

To one of the mirrors a peephole is made, either by eliminating the reflecting surface or by drilling a hole. It is necessary that in one of the cases a corresponding peephole is drilled and aligned with the peephole of the mirror.

Two, three or more of the intertwined flexible spiral springs 5, made out of colored plastic or any other flexible material, are adhered to the bottom of the front and rear case 1 and 2, or to the edge of the mirrors, framing them. When stretched and contracted, the springs 5 separate the housing cases 1 and 2 and the mirrors within, allowing free movement. When released, the springs contract, closing the casings 1 and protecting the springs 5 and mirrors 3 and 4.

The observer, when looking through the peephole 6, displacing with both hands the casings 1 and 2 and stretching the springs 5, will be looking at an infinite image of the springs 5 which form a kind of tunnel. Inside of this space, any small objects can be shown like stickers adhered to any one of the mirrors or any object introduced within the springs, like a flower, a pencil or the like, to create an amusing virtual image.

The lighting can be ambiental, although artificial lighting can be used.

Kaleidoscopes, according to this invention have many useful applications, including:

1) As a toy, it can be a small object with many features that motivates interest and creativity of the viewer in an amusing visual entertainment.

2) As a special effect device. When the peephole is big enough for the lens, images can be recorded, photographed or filmed.

3) For advertisement and exhibitions.

FIGS. 1 to 4 and 20, 21 show a kaleidoscope using circular shape casings mirrors 1–4 and circular shaped helical springs 5. It is possible also to use different shape casings, mirrors and springs and also to use only a single helical spring.

Figure 5:
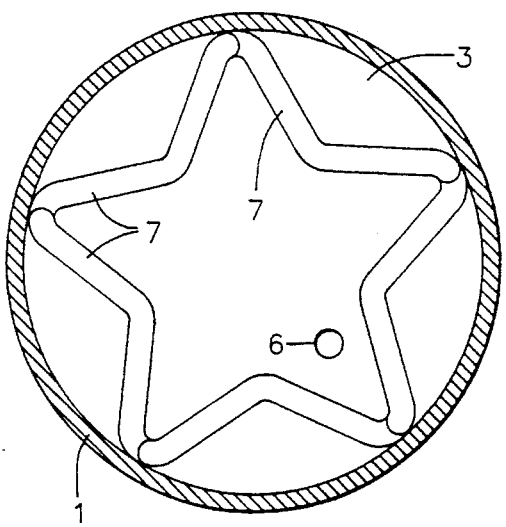
FIG. 5, is a cross sectional view taken along line B–B' in FIG. 3 with star section springs.
Figure 6:
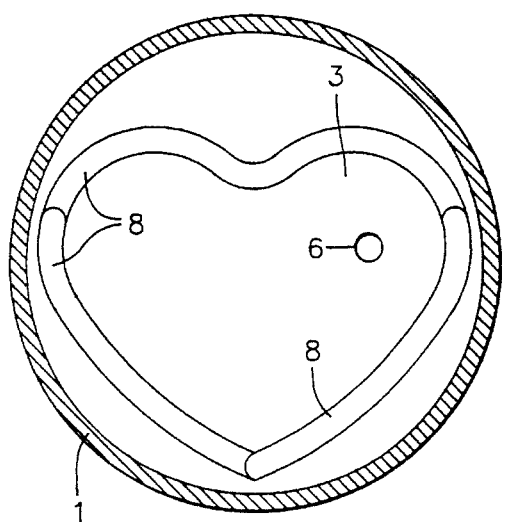
FIG. 6, is a cross sectional view taken alone line B–B' in FIG. 3 with heart shaped springs.
Figure 7:
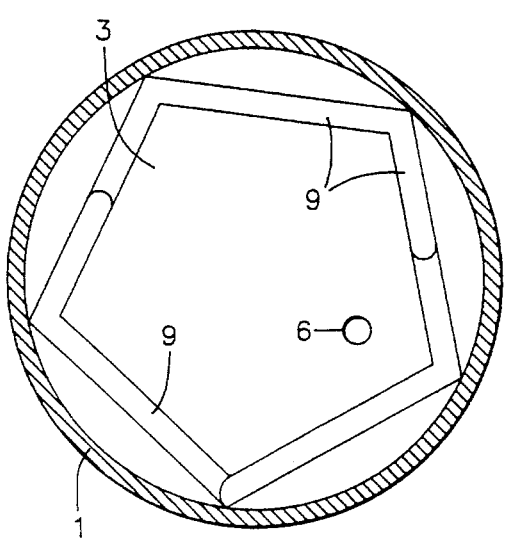
FIG. 7, is a cross sectional view taken along lines B–B' in FIG. 3 with pentagon shaped springs.
Figure 8:
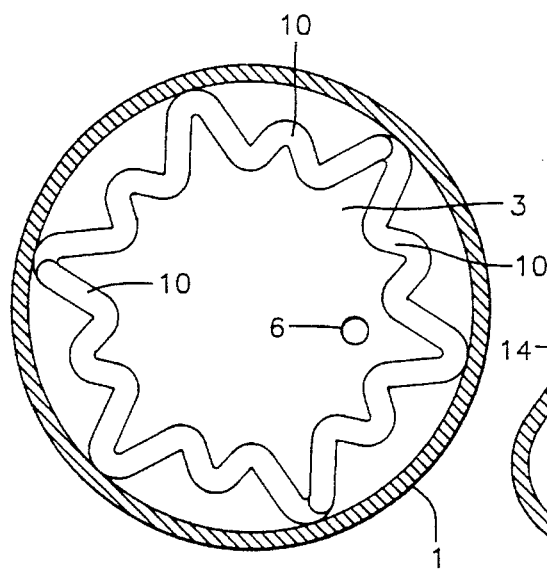
FIG. 8, is a cross sectional view taken along lines B–B' in FIG. 3 with sun shaped springs.
Figure 9:
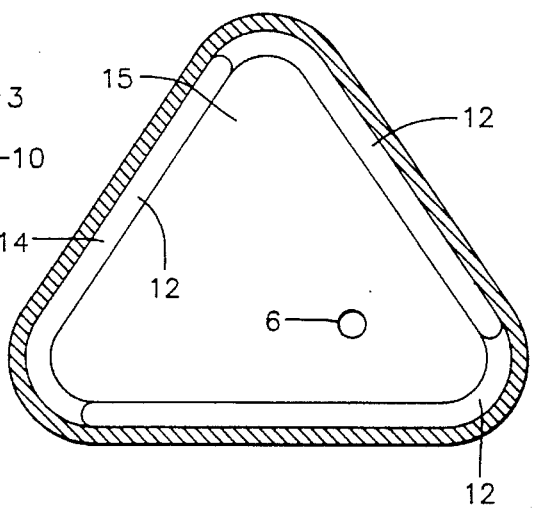
FIG. 9, ms a cross sectional view similar to FIGS. 4–8 with triangle shaped springs and kaleidoscope casings.
Figure 10:
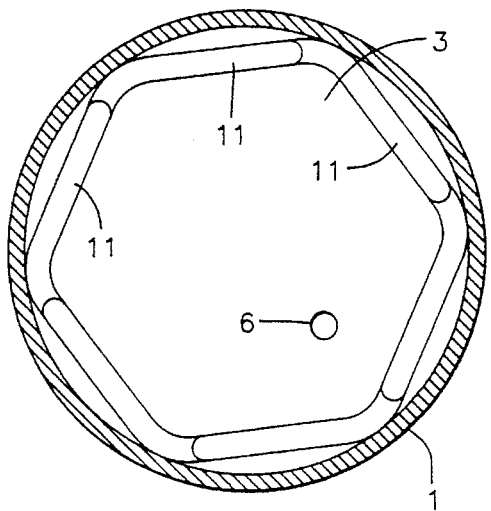
FIG. 10, is a cross sectional view taken along line B–B' in FIG. 3 with hexagonal shaped springs.
Figure 11:
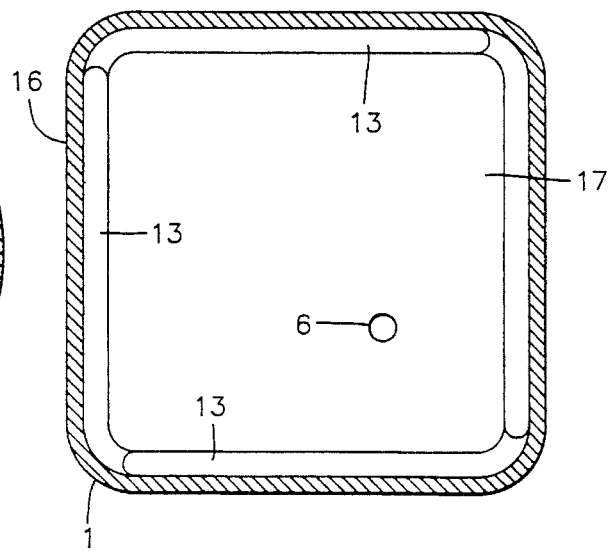
FIG. 11, is a cross sectional view similar to FIGS. 4–8 with square shaped springs and kaleidoscope casings.
Figure 12:
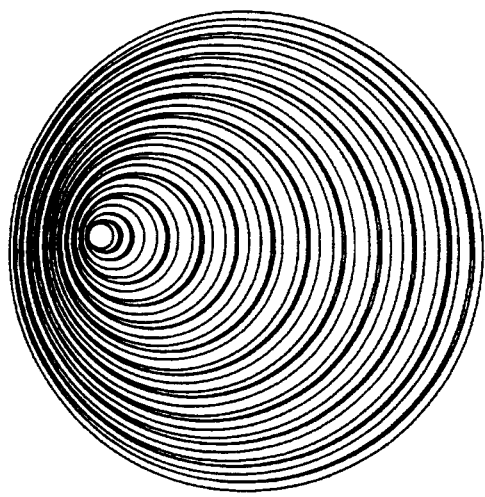
FIG. 12, is a perspective view of an aligned image created with circular springs as shown in FIG. 4.
Figure 13:
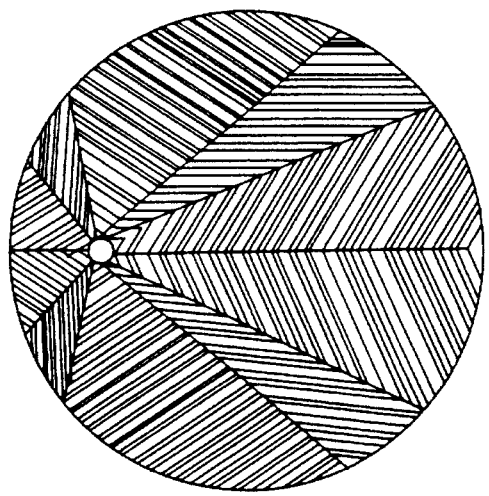
FIG. 13, is a perspective view of an aligned image created with star shaped springs, as shown in FIG. 5.
Figure 14:
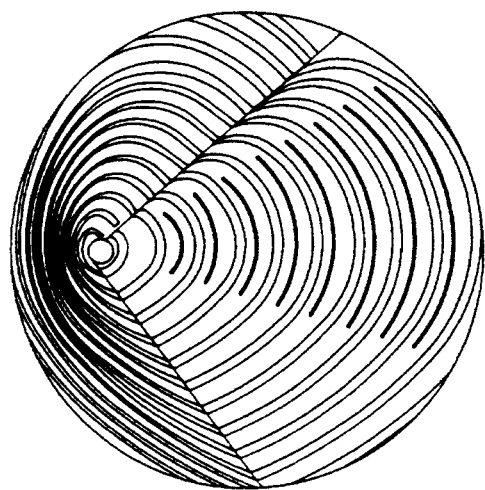
FIG. 14, is a perspective view of an aligned image created with heart shaped springs, as shown in FIG. 6.
Figure 15:
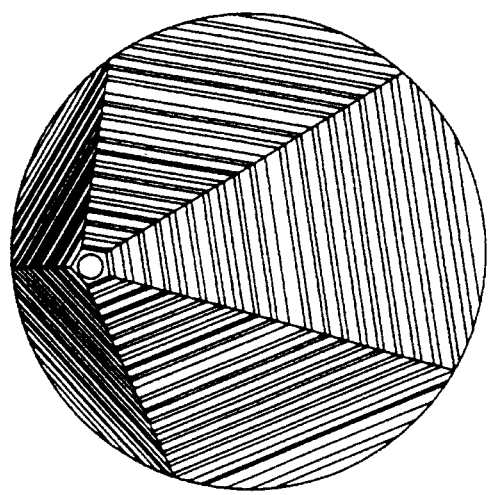
FIG. 15, is a perspective view of an aligned image created with pentagonal springs, as shown in FIG. 7.
Figure 16:
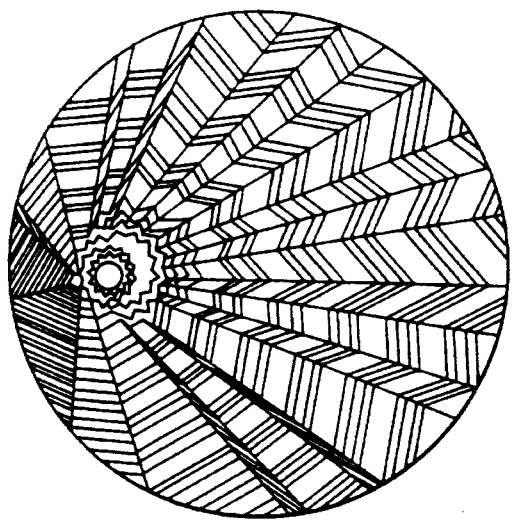
FIG. 16, is a perspective view of an aligned image created with sun shaped springs, as shown in FIG. 8.
Figure 17:
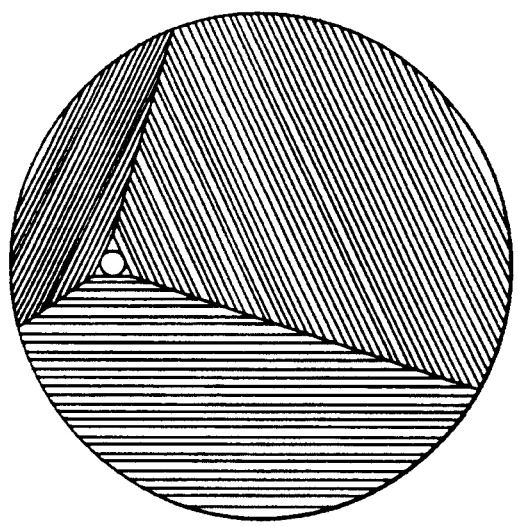
FIG. 17, is a perspective view of an aligned image created with triangular shaped springs, as shown in FIG. 9.
Figure 18:
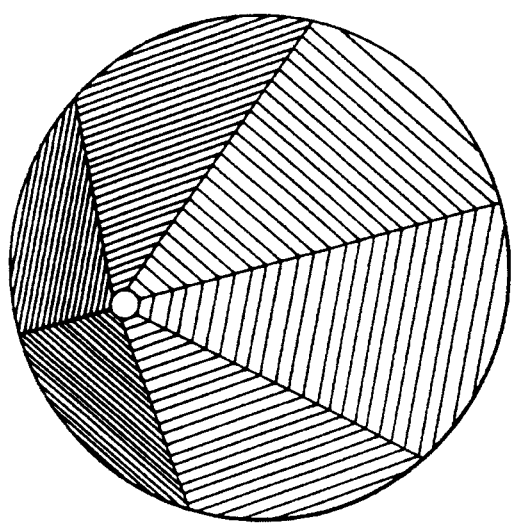
FIG. 18, is a perspective view of an aligned image created with hexagonal shaped springs, as shown in FIG. 10.
Figure 19:
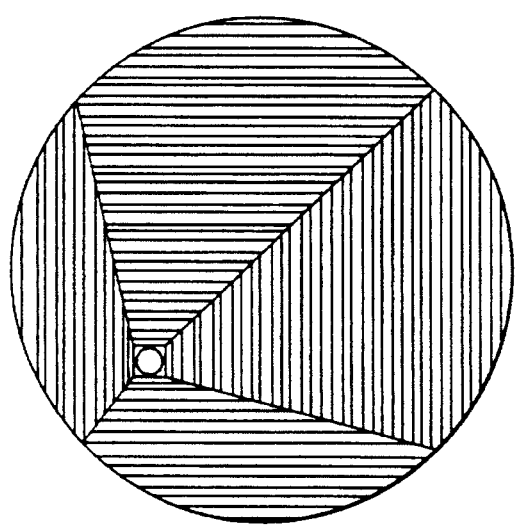
FIG. 19, is a perspective view of an aligned image created with square shaped springs, as shown in FIG. 11.

Thus, FIG. 5 shows the use of star shaped helical springs 7 in circular casings and the image produced thereby is shown in FIG. 13. FIG. 6 shows the use of heart shaped helical springs 8 in circular casings and the image produced thereby is shown in FIG. 14. FIG. 7 shows the use of pentagonal shaped springs 9 and the image produced is shown in FIG. 15. FIG. 8 shows the use of sun shaped strings 10 and the image produced is shown in FIG. 16. FIG. 9 shows the use of triangular shaped springs 12 in triangular casings, such as 14 with triangular mirrors, such as 15. An image produced by triangular springs with circular mirrors is shown in FIG. 17. FIG. 10 shows the use of hexagonal springs 11 and the image produced is shown in FIG. 18. FIG. 11 shows the use of square shaped springs 13 in square casings, such as casing 16 with square mirrors, such as 17. An image produced by square springs with circular mirrors is shown in FIG. 19.

While only preferred embodiments of the invention have been described herein in detail, the invention is not limited thereby and modifications can be made within the scope of the attached claim. For example, a peephole can be provided in each mirror.

What is claimed is:

1. An infinite kaleidoscope comprising a pair of opposed mirrors, helical spring means having opposite ends connected with the respective mirrors enabling the mirrors to be relatively moved toward one another, away from one another and tilted, and a peephole formed through one of the mirrors to enable an observer looking through the peephole to view an image in a tunnel defined by the spring means and multiply reflected by said mirrors and which is adjustable by relative movement of the mirrors.

2. An infinite kaleidoscope as claimed in claim 1 wherein the mirrors are mounted in respective cases each having a side wall and a base wall, a respective mirror being secured to a respective base wall and wherein said peephole is visible through the respective base wall.

3. An infinite kaleidoscope as claimed in claim 2 wherein the opposite ends of the spring means are connected to the mirrors by attachment to the respective cases.

4. An infinite kaleidoscope as claimed in claim 2 wherein the opposite ends of the spring means are attached directly to the respective mirrors.

5. An infinite kaleidoscope as claimed in claim 1 wherein the peephole is replicated in said one of the mirrors for binocular sighting of the image.

6. An infinite kaleidoscope as claimed in claim 1 wherein the peephole is the size of a human pupil.

7. An infinite kaleidoscope as claimed in claim 1 wherein the spring means comprises a plurality of intertwined helical springs.

8. An infinite kaleidoscope as claimed in claim 7 wherein the springs are of circular cross-section and the mirrors are circular.

9. An infinite kaleidoscope as claimed in claim 7 wherein the springs are of non-circular cross-section and the mirrors have a shape corresponding to the cross-section of the springs.

10. An infinite kaleidoscope as claimed in claim 7 wherein the springs are of a non-circular cross-section and the mirrors are circular.

11. An infinite kaleidoscope as claimed in claim 1 further including an image producing means on one of the mirrors.

12. An infinite kaleidoscope as claimed in claim 11 wherein the image producing means comprises a sticker.

* * * * *